United States Patent [19]
Cook

[11] 3,992,290

[45] Nov. 16, 1976

[54] METHOD FOR COALESCING OIL USING A BROMINATED MONOOLEFIN RESIN

[75] Inventor: Danny G. Cook, Walnut Creek, Calif.

[73] Assignee: Liquid Processing Systems, Inc., South San Francisco, Calif. ; a part interest

[22] Filed: Oct. 31, 1974

[21] Appl. No.: 519,751

Related U.S. Application Data

[63] Continuation-in-part of Ser. No. 465,169, April 26, 1974, abandoned.

[52] U.S. Cl. .......................... 210/23 R; 210/DIG. 5
[51] Int. Cl.² .......................................... B01D 17/02
[58] Field of Search .................. 260/94.9 H, 28.5 D; 210/23, DIG. 5, DIG. 21

[56] References Cited
UNITED STATES PATENTS

| | | | |
|---|---|---|---|
| 1,947,709 | 2/1934 | Garrison et al. | 21/23 X |
| 2,930,726 | 3/1960 | Jones et al. | 260/94.9 H X |
| 3,179,603 | 4/1965 | Edwards et al. | 210/23 X |
| 3,355,519 | 11/1967 | Muller et al. | 260/94.9 H X |
| 3,399,091 | 8/1968 | Cornay et al. | 260/94.9 H X |
| 3,598,708 | 8/1971 | Jackson, Jr. | 260/94.9 H X |
| 3,705,067 | 12/1972 | Ammons | 260/94.9 H X |
| 3,847,821 | 11/1974 | Krueger | 210/DIG. 5 X |

*Primary Examiner*—Frank A. Spear, Jr.
*Attorney, Agent, or Firm*—Flehr, Hohbach, Test, Albritton & Herbert

[57] ABSTRACT

A method for coalescing oil from an oil in water dispersion by passing the dispersion through a granular bed of brominated monoolefin resin.

4 Claims, No Drawings

METHOD FOR COALESCING OIL USING A BROMINATED MONOOLEFIN RESIN

CROSS-REFERENCE TO RELATED APPLICATIONS

This application is a continuation-in-part of my parent U.S. application Ser. No. 465,169, filed Apr. 26, 1974, now abandoned.

Reference is also made to a U.S. application Ser. No. 465,168 filed Apr. 26, 1974 entitled "Oil Separation System" in the name of the inventor of the present invention, now abandoned, and it's continuation-in-part application Ser. No. 580,537, filed May 23, 1975.

BACKGROUND OF THE INVENTION

This invention relates to a novel resin for use in coalescing oil from an oil-water liquid dispersion and to a method of forming the resin. Also, it relates to the method of separation of the oil into a layer using the resin.

It is known that the passage of an oil in water dispersion through a bed of hydrophobic polymer resin granules serves to remove some of the oil from the dispersion. The mechanism is such that the oil is attracted to the surface of the granules and is retained thereupon while the water is repelled from the same granules. The granules have been formed of materials including polyethylene, polypropylene, polyvinyl chloride, polyvinylidene chloride, and Teflon (polytetrafluoroethylene). However, since substantial amounts of the removed oil is retained upon the granules, it is necessary to clean the bed frequently, a costly and time consuming operation. Also, the effluent from the system has a relatively high oil content in comparison to the projected strict environmental standards for discharge. For example, in U.S. Pat. No. 3,654,944, using polyethylene granules, the most efficient oil removal in such a system is stated to be 19 ppm.

SUMMARY OF THE INVENTION AND OBJECTS

It is a general object of the present invention to provide a resin suitable for facilitating the removal of oil from an oil in water dispersion which overcomes the disadvantages of the above prior art resins.

It is another object of the invention to provide a system for coalescing oil from the above dispersion by passing the same through a bed of the above resin to produce a floating oil layer on a reservoir of the water effluent which can be removed by skimming to produce water of high purity.

It is a further object of the invention to provide a coalescing system of the above type in which frequent cleaning of the resin bed is unnecessary.

In accordance with the foregoing objects, a suitable granular resin is prepared by brominating a relatively branch chained monoolefin polymer resin (e.g., polyethylene or polypropylene) by treating the same with bromine gas. One method for carrying out the treatment is to expose the resin in solid form to the bromine gas for a sufficient time to penetrate throughout and react with the resin. The above brominated resin is used to coalesce oil into a floating phase from an oil in water dispersion by passing the dispersion through a bed of the resin and thereafter removing the floating oil layer as by skimming.

Further features and objects of the invention will be apparent from the following description in which the preferred embodiments of the invention have been set forth in detail.

DETAILED DESCRIPTION OF THE PREFERRED EMBODIMENTS

In accordance with the present invention, a brominated resin is provided which is particularly suited for coalescing oil from an oil in water liquid dispersion. In general, the resin is a brominated monoolefin polymer in which the double bonds in the vicinity of an end of the polymer chain has been substituted with at least two bromine atoms.

With respect to the polymer, the repeating unit of the chain comprises

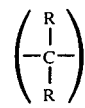

wherein R is an alkyl group or hydrogen. Thus, the base polymer includes polyethylene, polypropylene, polybutylene, polypentylene, polyhexylene, and other monoolefin polymers. The base polymer which is reacted with the bromine may be formed by conventional methods set forth hereinafter. Different techniques produce either straight chain or branched polymers. As will be explained herein, the straight chain molecules include a double bond at or in the vicinity of the terminal carbon atom in the chain while the branched polymer includes one additional double bond at or in the vicinity of the terminal carbon atom of each branched chain.

The monoolefin resin of the present invention should be sufficiently rigid for structural integrity upon the flow of liquids past the same. For this purpose, the molecular weight of the brominated resin is at least 15,000 and may range to as high as 50,000 or more.

In general, the brominated resin is formed by treating the monoolefin polymer resin with bromine. Excellent results of coalescing oil from oil-water dispersions have been found by the use of granules of a polyethylene resin brominated with bromine gas.

In one method for brominating the polyethylene, the resin in solid form is exposed to the bromine for a sufficient time to penetrate throughout and react with the resin. The resin is suitably in granular form during treatment since an important use of the resin is in a particulate bed through which an oil in water dispersion is passed. Thus, the polyethylene may be molded into small pellets or granules on the order of ⅛ inch in nominal diameter. However, it should be understood that this technique may be employed with sheets of polyethylene if desired for some other purpose.

The above solid resin bromination is preferably carried out under mild conditions, i.e., at room temperature (e.g., 25° C) or at slightly elevated temperatures if the rate of reaction is desired to be increased. However, the temperature is below that at which bromination occurs at the interior single bonded carbon atoms causing a break in the chain and a release of hydrogen bromide (HBr). For this purpose, the preferred temperatures are below 70° C. Also, no catalyst is employed which can cause such interior bromination.

Referring specifically to the bromination of straight chain polyethylene, the most common reaction which occurs is bromine saturation of the double bond at or in the vicinity of one of the terminal carbon atoms to form a 1,2-dibromopolyethylene according to the following equation:

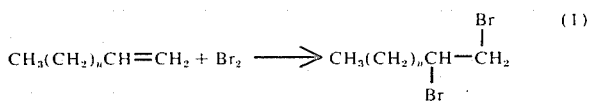

varying the position of the double bond in the chain will produce the corresponding dibromide. Where there is sufficient excess bromine, it is believed that other isomerides form by further substitution of the bromine at the saturated double bond to form tribromides according to the formulas 1,1,2-tribromopolyethylene or 1,2,2-tribromopolyethylene. These isomeride reactions are believed to occur in a relatively small proportion of the resin (e.g., less than 5% compared to the dibromide).

Other brominated substitutes across the double bond are possible. For example, 2-bromopolyethylene may be formed by the addition of HBr across the double bond. This might be present on the order of less than 5% of the polyethylene molecules. One possible source of the HBr is the reaction of the 1,2-dibromopolyethylene with bromine to produce the tribromopolyethylene and HBr.

The above reaction with HBr is undesirable for a number of reasons. It may cause degradation resulting in charring at elevated temperatures. This may be avoided by using lower bromination temperatures. Also, prolonged contact of the HBr at high concentration with the polyethylene tends to break the molecular chain to produce a resin of mushy consistency.

The reaction of the bromine with the double bond unsaturation is almost instantaneous upon contact. However, it may require a substantial time such as several hours to three days or more, for the bromine to reach the double bonds in the interior of a relatively thick (e.g., ¼ inch to ½ inch) polyethylene sheet. Therefore, the limiting factor in the bromine exposure time for complete reaction with the double bond is the diffusion of the bromine through the polyethylene to contact the double bonds rather than the time for the reaction to take place.

One method for determining whether or not the bromination is complete is to view the color of the product. For polyethylene, the initial color is white, whereas the final color after complete bromination is a reddish brown color. The degree of bromination is determined by the depth of the resin color.

In another technique of bromination, the polyethylene is dispersed in a petroleum hydrocarbon by the application of heat. Specifically, the polyethylene can be dispersed in a highly refined kerosene at a temperature of 180°–190° F to form a clear, miscible mixture. The polyethylene molecule does not form a solution but dissolves into a colloidal suspension. In this environment, the bromine gas is passed to brominate the polyethylene. In general, the solid product which is solidified from suspension has a rough surface in comparison to that formed by solid state treatment as set forth above.

The brominated polyethylene in suspension is suitable for coating onto other substrate materials, such as sintered rice hulls. This conserves the amount of the product for use in a resin bed.

It has been found that the brominated product formed by either of the above methods retains the characteristic reddish brown brominated color over extended periods. The resin is characterized by an odor which indicates that bromine is released during storage. It is believed that this released gas is the excess bromine which diffuses into the polymer and is retained therein but which did not react with the polymer double bond. Thus, during storage the bromine content in the polymer gradually decreases to an amount which reacted with the double bond.

Referring specifically to the base polyethylene resin prior to bromination, it is known that such resins have been produced which range from less than 1,000 to a high as 2 million molecular weight. However, as set forth above, a preferred molecular weight for the polyethylene resin of the present invention is from 15,000 to 50,000 with an average molecular weight of about 25,000. At the low end of this range, say, an unbranched 1,000 carbon atom chain, the total molecular weight is 14,027 and the stoichiometric amount of bromine to saturate the single double bond is two atoms for a combined molecular weight of about 160. For this composition, the bromine content in the polyethylene is about 1.1% by weight. For a 2,000 carbon atom chain, the same dibromide polymeric molecule contains about 0.55% by weight. The presence of tri- and tetra-bromo isomerides yields a theoretical bromine range of about 0.3% to 2.2% by weight for a molecular weight range of 15,000 to 50,000.

The amount of bromine added should be at least sufficient to react stoichiometrically with all double bonds present in the polyethylene. For this system the amount of bromine is 0.3–2.2% by weight of polyethylene. With other monoolefins, this amount of bromine may be as low as 0.01% or as high as 50%. As a practical matter, a higher proportion of bromine may be used to drive the reaction. The unreacted bromine may be recovered from the system so as to recycle the same for further polymer treatment.

It is known that high-density polyethylene is an essentially linear, straight chain molecule. On the other hand, branching reduces the density. For example, the theoretical density of a 100% branched polyethylene is about 0.850 g/cc as compared to 0.965 g/cc for the linear high-density mixture. It is theorized that high-density polyethylene (0.941 to 0.965 g/cc) branching ranges essentially zero to about 21%. In the medium density range (0.926 to 0.940), branching ranges from about 21 to about 34%. In the low density range (0.910 to 0.925), the branching ranges from about 34% to 47.88%. Within these guidelines, it is possible to calculate the stoichiometric amount of bromine required for the polyethylene with a given density and molecular weight.

It has been found that the high density polyethylene (e.g., a density above 0.941) does not contain sufficient double bonds for bromination to an extent preferable for oil coalescing as set forth hereinafter. Thus, a preferable degree of branching in the starting resin is at least 21%.

Any conventional process for the production of polyethylene may be employed for the base polymer of the present invention. One process employs free radical catalysts such as organic peroxides, or diazo compounds. These types of polymerization catalysts produce polyethylene molecules with a number of branches of the type set forth above. Each branch includes a double bond near the terminal carbon atom of the molecule.

Another polymerization system for polyethylene employs stereospecific ionic catalysts comprising organometallic groups such as alkyl aluminum and titanium trichloride or the titanium trichloride co-crystallized with aluminum chloride and the alkyl aluminum. This type of catalyst is designated a Ziegler type. It produces a more linear polyethylene product of higher density and isotactic molecular structure.

The above types of polymerization systems for polymonoolefins are well known to those skilled in the art. The polymers produced thereby are characterized by double bonds at or near the terminal carbon atom of the polymer. This position of the double bond predominates to a high degree over mid-chain unsaturation. As set forth above, it is these double bonds that form the reactive sites for bromination.

A brominated resin of the above type is characterized by a strong dipole moment because of the strong electro-negative bromine atoms at one end of the molecule and the lack of substitution in the remainder of the chain. This is to be contrasted with the other polymers which have been used in an attempt to separate oil from water, namely, polyethylene, polypropylene, polyvinylchloride, and Teflon (polytetrafluoroethylene). All of these molecules are highly symmetrical and balanced and so do not exhibit a dipole moment. Thus, such polymers are highly inert.

It has been found that the passing of an oil in water dispersion through a bed of the brominated resin granules of the present invention causes the oil to coalesce and form into a floating layer downstream from the resin bed. Furthermore, it has been found that the brominated resins, particularly those formed by the solid state gaseous reactions, have a relatively low tendency to retain such coalesced oil on the resin.

It is theorized that the above ability of the resin to coalesce fine oil droplets dispersed or emulsified in water is caused by "zeta potentials" which neutralize the protective colloid charges on the oil droplets which enables the same to coalesce. Also, it is believed that the thus coalesced particles are not strongly attracted to the resin for rapid coating thereon because in this state wherein the colloidal charges are removed, the coalesced phase is not attracted to the highly ionic nucleophilic site of coalescing.

The above effect is analogous to well known ability of a strong acid to break an oil emulsion. For example, by the addition of high ionized hydrobromic acid to an oil emulsion, the oil droplet charges are split by the electrophilic acid proton and the nucleophilic bromine ion. Thus, the hydrogen proton seeks out negatively charged droplets while the bromine atoms seek out positively charged droplets. This stripping of the charges enables the oil to coalesce in a similar manner to the resin of the present invention.

Comparative testing was performed to illustrate the remarkable ability of a polymer formed according to the present processes to coalesce oil droplets dispersed in water. Highly branch chained polyethylene granules were brominated by exposure to gaseous bromine. A resin bed of this type was deposited at a 6 inch depth in column 1 while a resin bed of unbrominated polyethylene was deposited in column 2 at the same depth. A valve was positioned above the resin bed to maintain the prepared oil in water emulsion prior to passing through the bed. This particular emulsion included 1 part of turbine type oil in 9 parts of water. The oil was emulsified in the water by means of a blender and equal amounts of the same emulsion were placed above the valve in the two resin beds.

The valves were opened simultaneously and the oil in water dispersion passed through the resin bed at a contact time of about 15 seconds. The effluent from column 1 immediately began coalescing whereas the effluent from column 2 passed through the plain polyethylene without any visible coalescing. In fact, oil from the effluent of column 1 formed a coalesced floating phase at the top of the collecting column above a clear water phase within one minute. In contrast, after 48 hours the fine emulsion which passed through the plain polyethylene phase showed no coalescing with the oil droplets being dispersed throughout the effluent.

It has been found that the formation of the floating oil phase is assisted by permitting the top of the liquid effluent to be in contact with the surrounding air. Since the oil is more attracted to the air than the water, it is apparent that such contact assists the formation of a distinct floating coalesced phase of oil. To complete the separation, the oil may be withdrawn by a conventional skimming technique such as decanting, applying a mild vacuum to the top, or physically skimming the oil.

The above process is particularly well suited for use in a resin bed as part of a system to separate oil from water of the type set forth in my aforementioned U.S. application Ser. No. 465,168, filed Apr. 26, 1974. This system is incorporated by reference as an illustrative method for separating oil from water using the resin of the present application.

I claim:

1. In a method for coalescing oil from an oil in water liquid dispersion, the step of passing the dispersion through a bed of resin granules to form a coalesced floating layer of oil on the water, said resin comprising a brominated monoolefin polymer in which the repeating units of the polymer chain comprises

wherein R is an alkyl group or hydrogen.

2. A method as in claim 1 in which the polymer is polyethylene with a substantial number of branch chains.

3. A method as in claim 1 in which the coalesced oil layer is in contact with the surrounding air.

4. A method as in claim 3 in which the oil layer is removed from the water by skimming.

* * * * *